(12) United States Patent
Yang et al.

(10) Patent No.: US 12,501,336 B2
(45) Date of Patent: Dec. 16, 2025

(54) UE OPTIMIZATION IN EPS FALLBACK FAST RETURN PROCEDURE

(71) Applicant: QUALCOMM Incorporated, San Diego, CA (US)

(72) Inventors: Kaikai Yang, Xian (CN); Haojun Wang, Xian (CN); Jie Ren, Xian (CN); Zhenqing Cui, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 18/262,903

(22) PCT Filed: Apr. 2, 2021

(86) PCT No.: PCT/CN2021/085267
§ 371 (c)(1),
(2) Date: Jul. 25, 2023

(87) PCT Pub. No.: WO2022/205418
PCT Pub. Date: Oct. 6, 2022

(65) Prior Publication Data
US 2024/0080735 A1   Mar. 7, 2024

(51) Int. Cl.
*H04W 36/14* (2009.01)
*H04W 36/00* (2009.01)
*H04W 36/18* (2009.01)

(52) U.S. Cl.
CPC ..... *H04W 36/144* (2023.05); *H04W 36/0022* (2013.01); *H04W 36/0072* (2013.01); *H04W 36/00837* (2018.08); *H04W 36/18* (2013.01)

(58) Field of Classification Search
CPC ......... H04W 36/144; H04W 36/00837; H04W 36/0022; H04W 36/0072; H04W 36/18
See application file for complete search history.

(56) References Cited

U.S. PATENT DOCUMENTS 11,943,669 B2 * 3/2024 Kabadi ............... H04L 65/1016
2019/0053028 A1 2/2019 Chandramouli et al.
(Continued)

FOREIGN PATENT DOCUMENTS

| CN | 111698772 A | 9/2020 |
| CN | 112399362 A | 2/2021 |

(Continued)

OTHER PUBLICATIONS

Supplementary European Search Report—EP21934075—Search Authority—Munich—Dec. 9, 2024.
(Continued)

*Primary Examiner* — Curtis B Odom
(74) *Attorney, Agent, or Firm* — Paul M. McAdams; Patterson & Sheridan LLP

(57) ABSTRACT

Certain aspects of the present disclosure provide a technique for wireless communications by a user equipment (UE). The UE starts a procedure for a mobile terminated (MT) or mobile originated (MO) call in a first radio access technology (RAT) network. The UE receives a first command for the UE to move to a second RAT network to continue the call, and in response establishes a connection with the second RAT network to continue the call. The UE starts a timer based on an end of the call and take one or more actions dependent at least in part on the timer to prioritize return to the first RAT network in a standalone (SA) mode.

30 Claims, 9 Drawing Sheets

(56) References Cited

U.S. PATENT DOCUMENTS

2020/0053616 A1 2/2020 Zhu et al.
2020/0383010 A1 12/2020 Zhu et al.
2021/0084593 A1 3/2021 Jia et al.

FOREIGN PATENT DOCUMENTS

CN 112533261 A 3/2021
WO 2020149773 A1 7/2020

OTHER PUBLICATIONS

International Search Report and Written Opinion—PCT/CN2021/085267—ISA/EPO—Jan. 7, 2022.

\* cited by examiner

UE OPTIMIZATION IN EPS FALLBACK FAST RETURN PROCEDURE

CROSS-REFERENCE TO RELATED APPLICATION(S)

This application is a national stage application under 35 U.S.C. 371 of PCT/CN2021/085267, filed Apr. 2, 2021, which is hereby expressly incorporated by reference herein in its entirety as if fully set forth below and for all applicable purposes.

INTRODUCTION

Aspects of the present disclosure relate to wireless communications, and more particularly, to techniques for improved communications in evolved packet system (EPS) fallback procedures.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a user equipment (UE), including starting a procedure for a mobile terminated (MT) or mobile originated (MO) call in a first radio access technology (RAT) network; receiving a first command for the UE to move to a second RAT network to continue the call; establishing, in response to the first command, a connection with the second RAT network to continue the call; starting a timer based on an end of the call; and taking one or more actions, dependent at least in part on the timer, to prioritize return to the first RAT network in a standalone (SA).

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for wireless communications by a user equipment (UE).

According to certain aspects, the UE starts a procedure for a mobile terminated (MT) or mobile originated (MO) call in a first radio access technology (RAT) network (e.g., a new radio (NR) network). The UE receives a first command for the UE to move to a second RAT network (e.g., a long term evolution (LTE) network) to continue the call, and in response establishes a connection with the second RAT network to continue the call. The UE starts a timer based on an end of the call and take one or more actions (dependent at least in part on the timer) to prioritize return to the first RAT network in a standalone (SA) mode.

For example, the techniques presented herein may allow a UE to prioritize returning to a 5G SA network, rather than a non-standalone NSA. As the name suggests, NSA generally refers to a 5G service that is built over an existing 4G (LTE) network (and is, thus, not considered standalone). SA, on the other hand, allows completely independent operation of a 5G service without any interaction with an existing 4G/LTE core, which may result in availability of greater services, improved performance, and better overall user experience.

Introduction to Wireless Communication Networks

Figure 1:
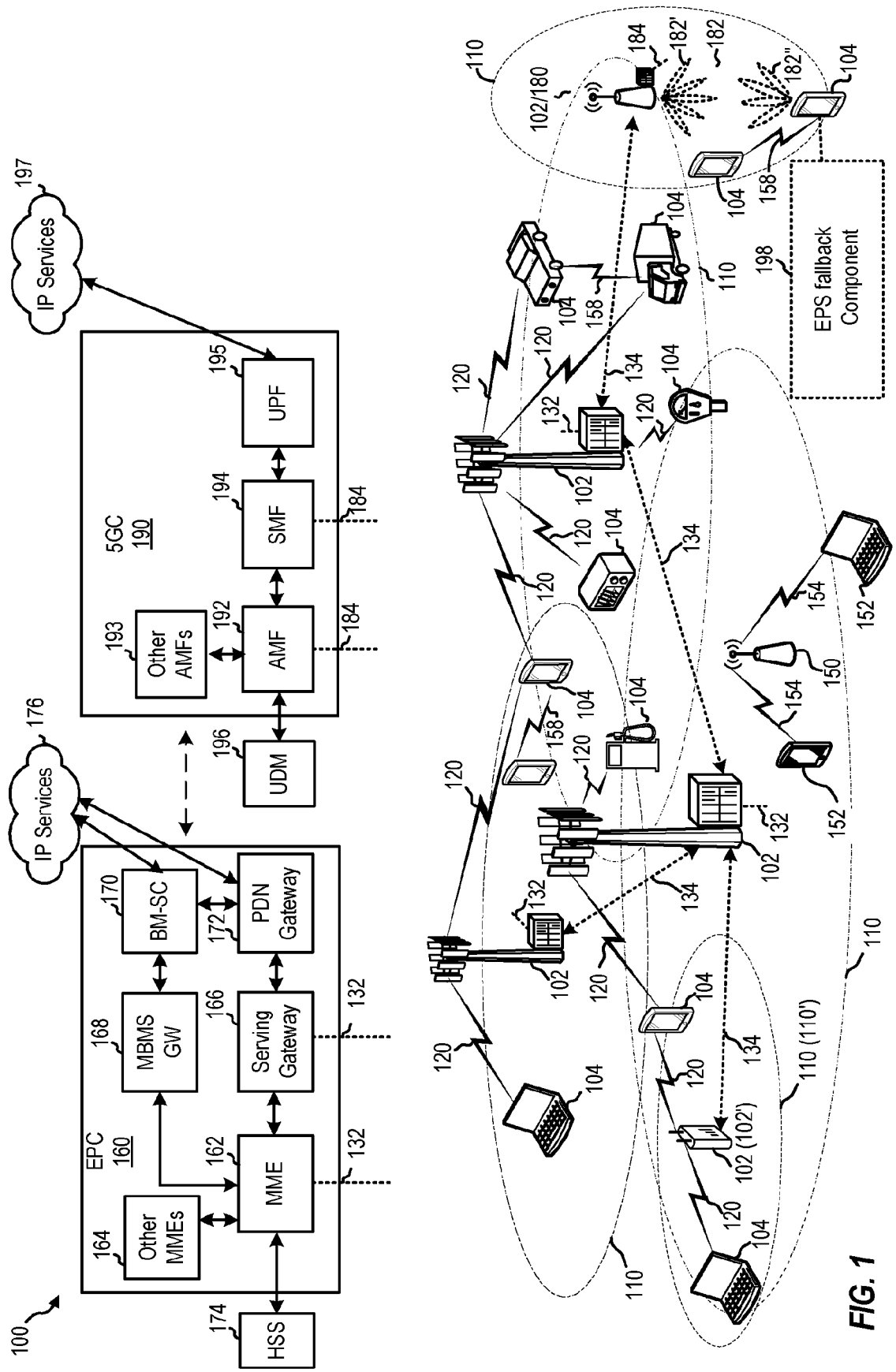
FIG. 1 is a block diagram conceptually illustrating an example wireless communication network.

FIG. 1 depicts an example of a wireless communications system 100, in which aspects described herein may be implemented.

Figure 5:
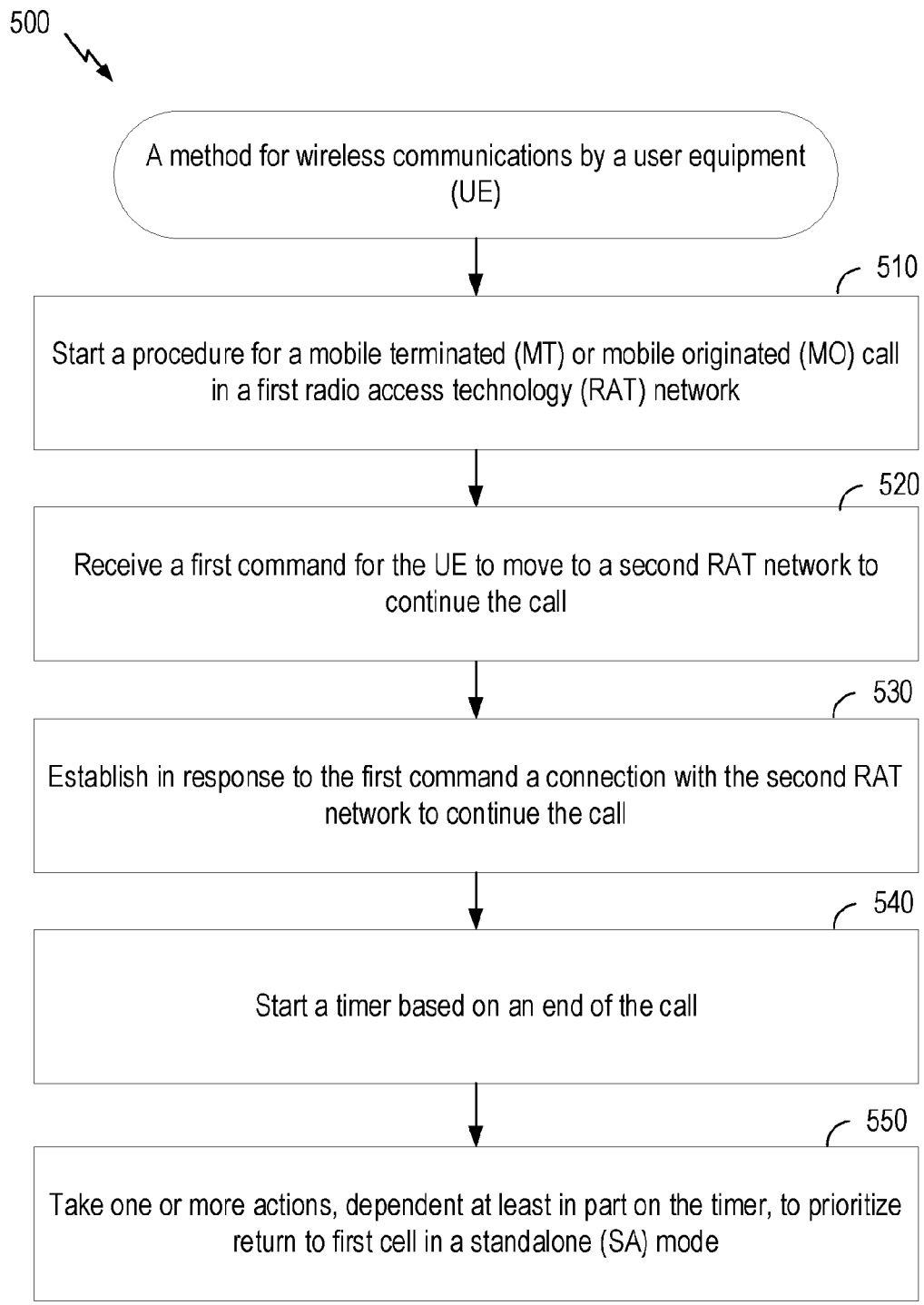
FIG. 5 depicts a flow diagram illustrating example operations for wireless communications by a UE, according to certain aspects of the present disclosure.

For example, wireless communication system 100 includes EPS fallback component 198, which may be configured to perform, or cause a user equipment (UE) 104 to perform, operations 500 of FIG. 5.

Generally, wireless communications system 100 includes base stations (BSs) 102, UEs 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs 102 may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 2:
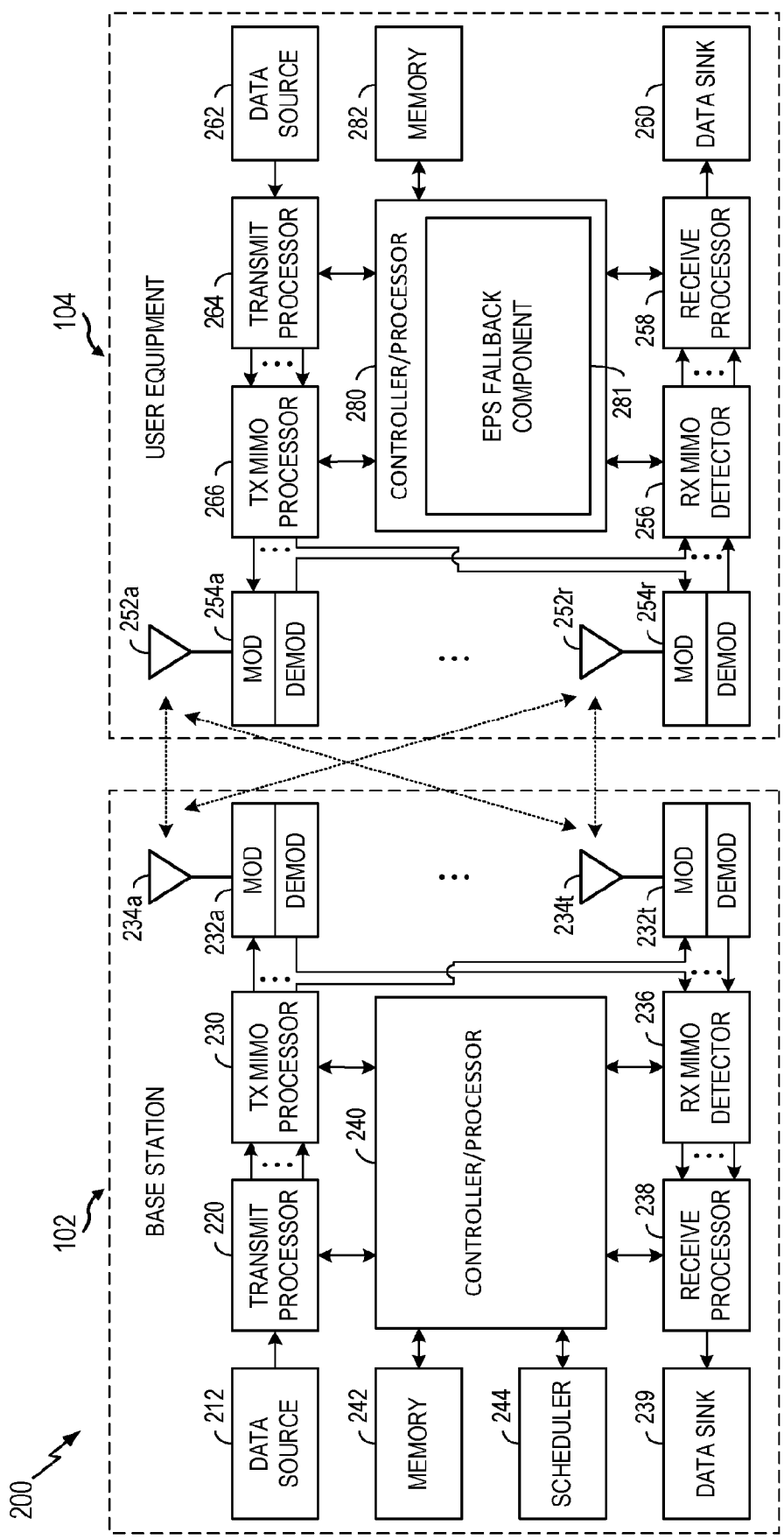
FIG. 2 is a block diagram conceptually illustrating aspects of an example base station (BS) and user equipment (UE).

FIG. 2 depicts aspects of an example base station (BS) 102 and a user equipment (UE) 104.

Generally, BS 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., source data 212) and wireless reception of data (e.g., data sink 239). For example, BS 102 may send and receive data between itself and UE 104.

BS 102 includes controller/processor 240, which may be configured to implement various functions related to wireless communications.

Generally, UE 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., source data 262) and wireless reception of data (e.g., data sink 260).

UE 104 includes controller/processor 280, which may be configured to implement various functions related to wireless communications. In the depicted example, controller/processor 280 includes EPS fallback component 281, which may be representative of EPS fallback component 198 of FIG. 1. Notably, while depicted as an aspect of controller/processor 280, EPS fallback component 281 may be implemented additionally or alternatively in various other aspects of UE 104 in other implementations.

Figure 3:
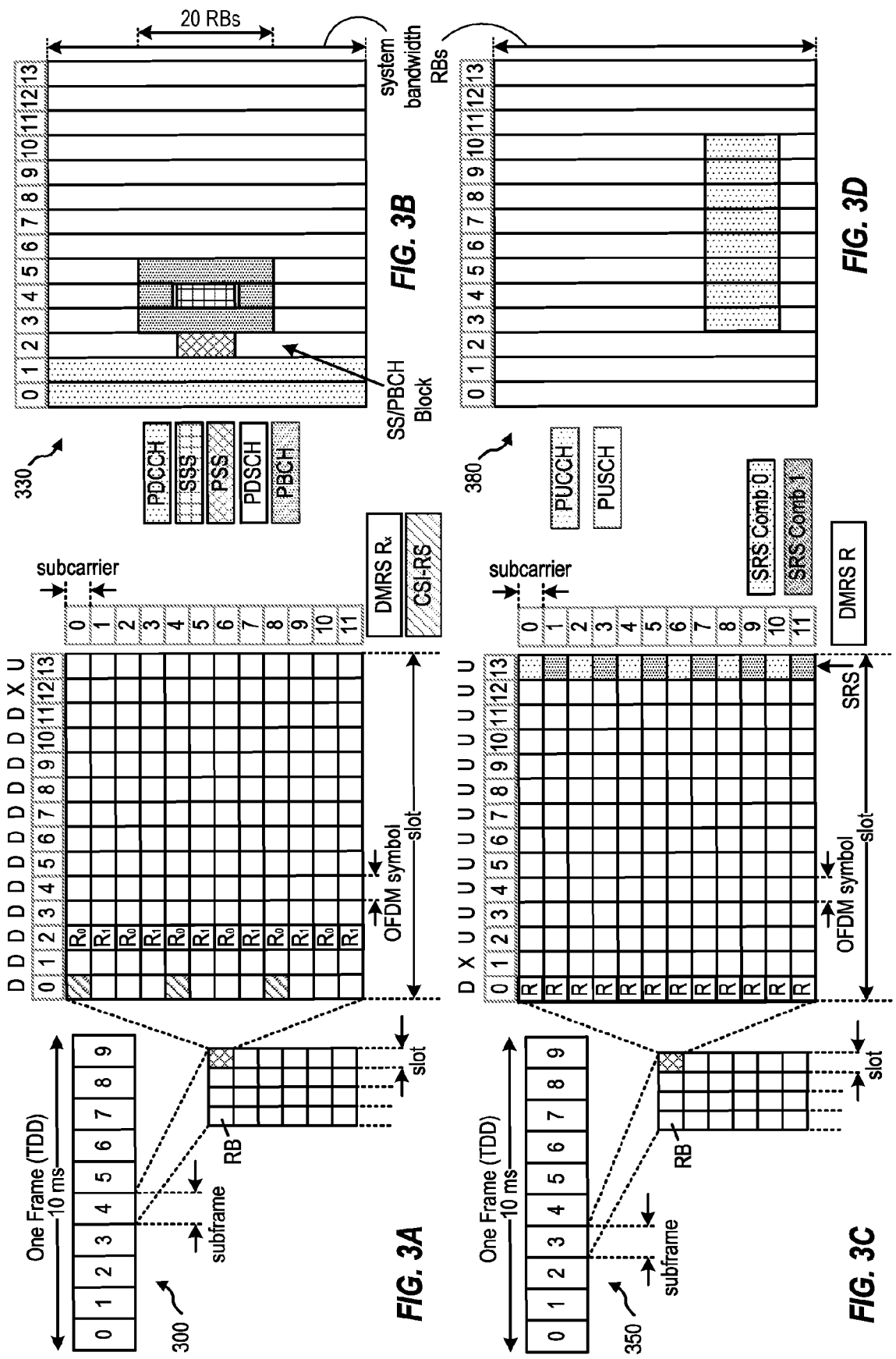
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave BS 180 may utilize beamforming 182 with the UE 104 to improve path loss and range. To do so, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". BS 180 may receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Aspects Related to EPS Fallback Fast Return Procedure

In current systems, calls using voice-over new radio (VoNR) may not always be available on a network side, or may become unavailable during a (voice or data) call. Accordingly, an EPS fallback call procedure has been introduced as a solution to support calls in a NR network (e.g., gNB), allowing a device to fallback to an LTE network if needed to maintain a call.

For a typical EPS fallback scenario, a user equipment (UE) first begins a mobile originated (MO) and/or mobile terminated (MT) call in the NR network, such as an IP Multimedia Subsystem (IMS) call. The NR network then configures the UE to measure one or more long term evolution (LTE) frequencies and send a report for a B1 event. A B1 event is triggered when an inter-RAT neighbor cell becomes better than a threshold.

After the UE reports a B1 measurement report (MR) to the NR network, the NR network configures the UE to move to (e.g., fallback to) an LTE network (e.g., eNB). The fallback of the UE to the LTE network from the NR network is accomplished by a handover or a redirection. After the UE moves to the LTE network, a voice-over LTE (VoLTE) call (e.g., an internet protocol (IP) multimedia services (IMS) call) is set up to continue the call service. During the ongoing call, the UE remains in the LTE network.

Figure 4:
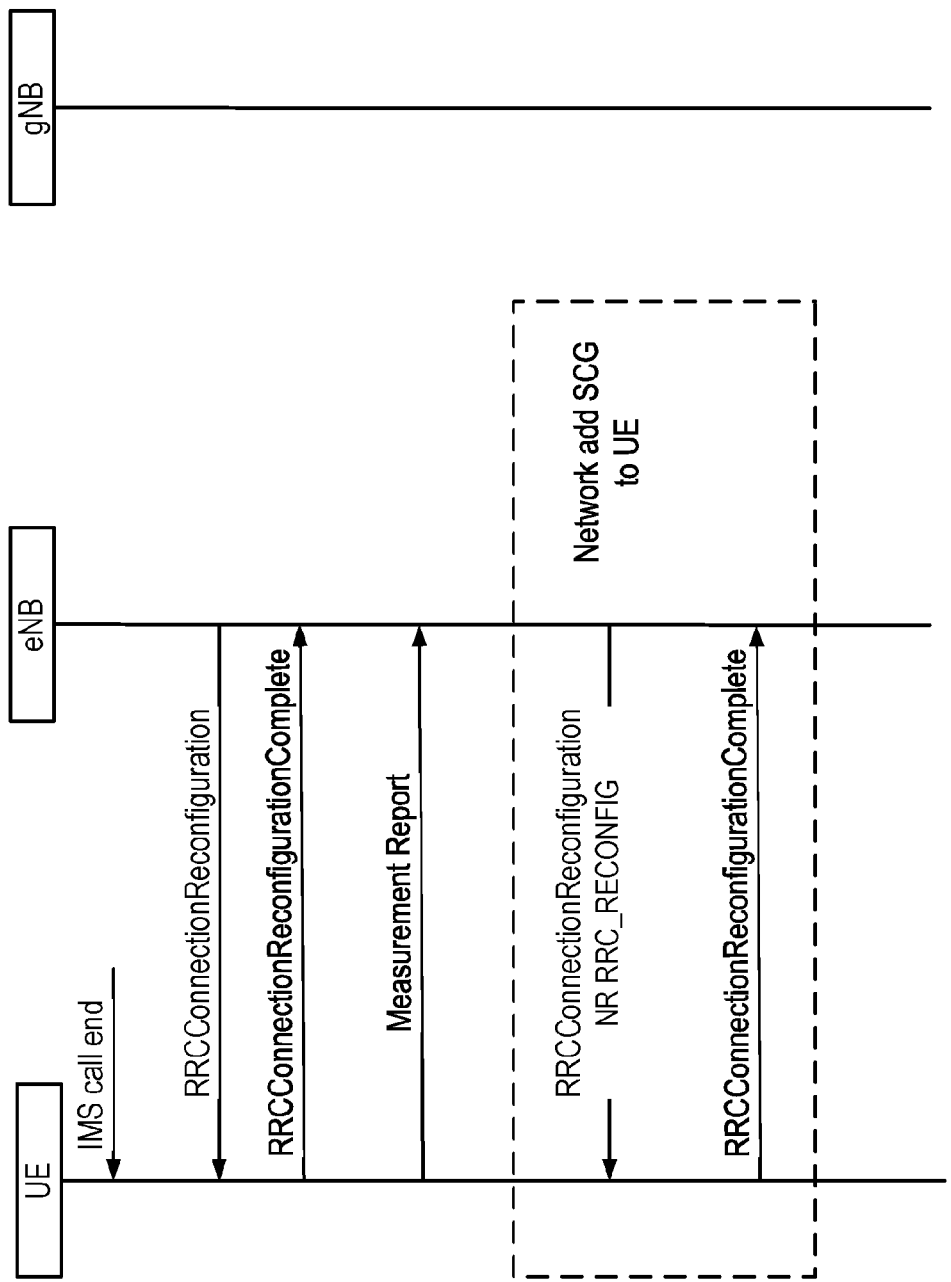
FIG. 4 depicts a call flow diagram for an example evolved packet system (EPS) fallback procedure.

After the call ends, it is generally desirable that the UE return back to the NR network as soon as possible. For example, in some implementations, as illustrated in FIG. 4, after the call ends, the LTE network sends signaling (e.g., a radio resource control (RRC) connection reconfiguration message) to the UE, and configures the UE to measure one or more NR frequencies and send a report for a B1 event.

After the UE reports a B1 MR to the LTE network, the LTE network may have two options for this B1 MR. As per a first option, the LTE network may add a secondary cell group (SCG) to the UE, which may enable the UE to move to a non-standalone (NSA) mode. As per a second option, the LTE network may redirect the UE to NR standalone (SA). The LTE network may implement any of these two options, and the UE may not know which option is actually implemented. For various reasons, network operators, as well as users, may prefer that the UE returns to the NR network in the SA mode.

Aspects of the present disclosure provide a technique, which may facilitate a prioritized return of a UE to a cell (e.g., an NR cell) in an SA mode after a fallback to another cell (e.g., an LTE cell). For example, as described herein, the UE may take actions based on timer information to prioritize the return to a NR network in the SA mode (e.g., after completing an IMS call in a LTE network). Accordingly, the UE may be able to stay longer in the NR network in the SA mode, which has a better key performance indicator (KPI) for the both the UE and the NR network.

FIG. 5 depicts a flow diagram illustrating example operations 500 for wireless communication. The operations 500 may be performed, for example, by a UE (e.g., such as the UE 104 in the wireless communication system 100 of FIG. 1). The operations 500 may be implemented as software components that are executed and run on one or more processors (e.g., the controller/processor 280 of FIG. 2). Further, transmission and reception of signals by the UE in operations 500 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 500 begin, at 510, by starting a procedure for a MT or MO call in a first radio access technology (RAT) network. For example, the UE may start the procedure for the MT or MO call using processor(s), antenna(s), and/or transceiver components of the UE 104 shown in FIG. 1 or FIG. 2 and/or of the apparatus shown in FIG. 9.

At 520, the UE receives a first command for the UE to move to a second RAT network to continue the call. For example, the UE may receive the first command using antenna(s) and receiver/transceiver components of the UE 104 shown in FIG. 1 or FIG. 2 and/or of the apparatus shown in FIG. 9.

At 530, the UE establishes in response to the first command a connection with the second RAT network to continue the call. For example, the UE may establish the connection with the second RAT network using antenna(s) and/or transceiver components of the UE 104 shown in FIG. 1 or FIG. 2 and/or of the apparatus shown in FIG. 9.

At 540, the UE starts a timer based on an end of the call. For example, the UE may start the timer when the call ends using processor(s), antenna(s), and/or transceiver components of the UE 104 shown in FIG. 1 or FIG. 2 and/or of the apparatus shown in FIG. 9.

At 550, the UE takes one or more actions dependent at least in part on the timer to prioritize return to the first RAT network in a standalone (SA) mode. For example, the UE may take the one or more actions using processor(s), antenna(s), and/or transceiver components of the UE 104 shown in FIG. 1 or FIG. 2 and/or of the apparatus shown in FIG. 9.

In certain aspects, the UE receives a second command for the UE to return to the first RAT network prior to expiration of the timer. In such a case, the one or more actions include deciding whether to follow or ignore the second command depending on whether the second command is for the UE to return to the first RAT network in the SA mode or a non-standalone (NSA) mode.

Figure 6:
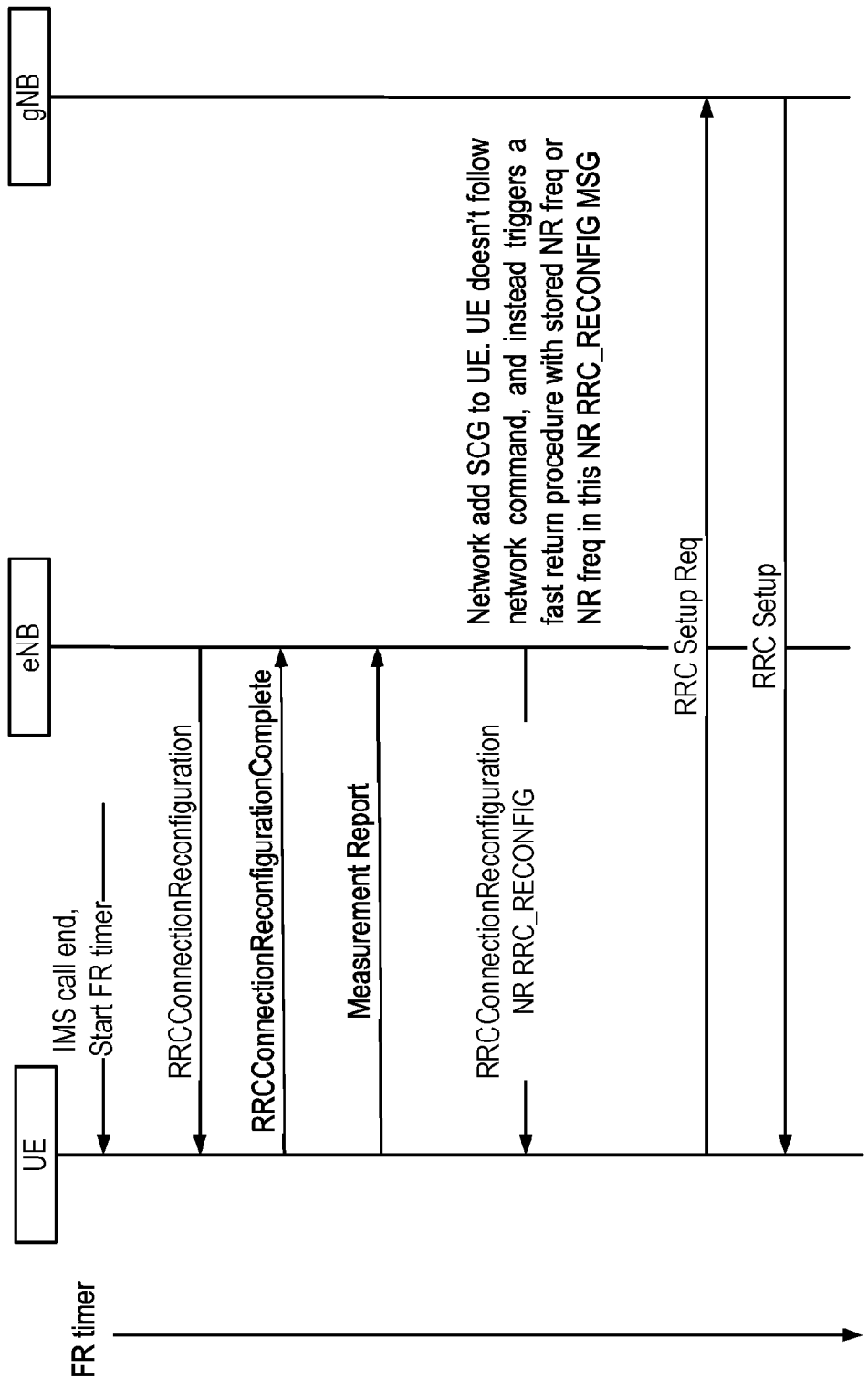
FIGS. 6-8 depict call flow diagrams for EPS fallback fast return (FR) procedures, according to certain aspects of the present disclosure.
Figure 7:
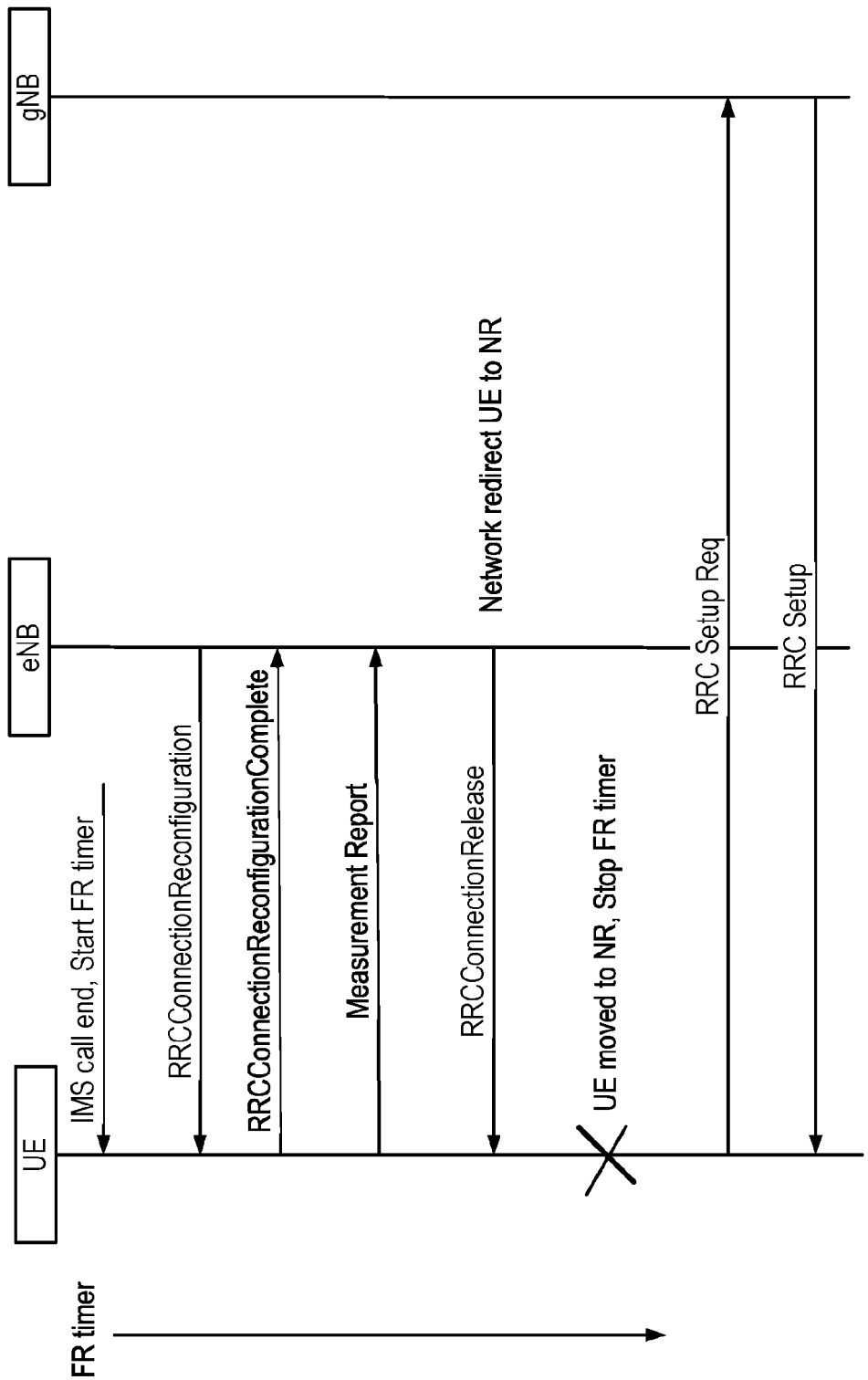
Figure 8:
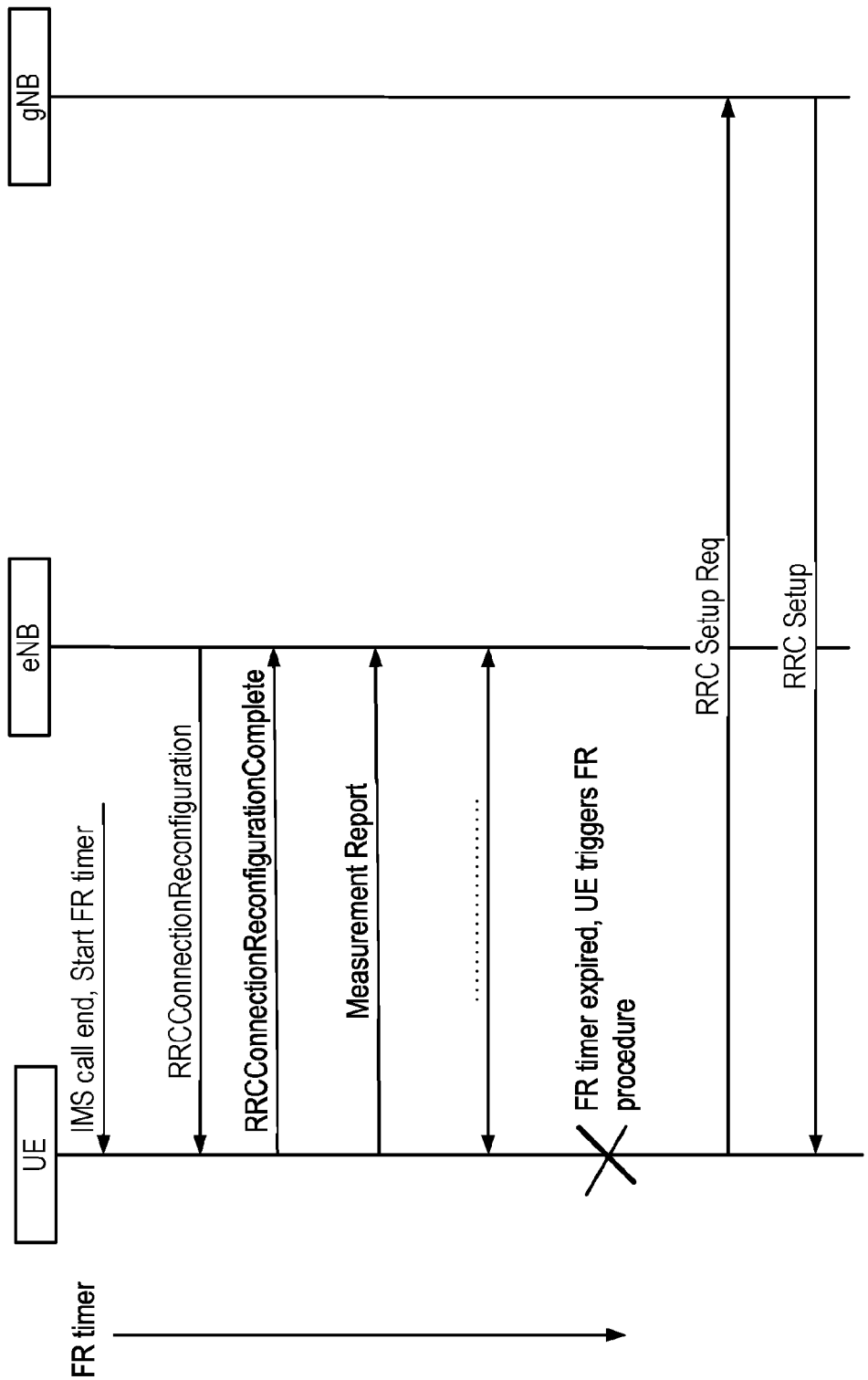

The operations 500 may be further understood in the context of the call flow diagrams of FIGS. 6-8 which depict different scenarios. As illustrated, in each case, after a UE completes an IMS call on a second RAT network (e.g., eNB), the UE starts a timer referred to herein as a fast return (FR) timer.

As illustrated in FIG. 6, after the UE completes the IMS call on a second RAT network (e.g., eNB), and starts the FR timer, the UE then sends a B1 MR to the second RAT. In the example illustrated in FIG. 6, the UE receives a second command from the second RAT prior to expiration of the timer. The second command indicates the UE to return to a first RAT network (e.g., gNB) in a NSA mode.

In this scenario, because the UE prioritizes a return to the first RAT in an SA mode, the UE ignores the second command. The UE then initiates a procedure to attempt a return to the first RAT network in the SA mode. The UE then establishes the connection with the first RAT network prior to the expiration of the timer using the previously obtained cell frequency information.

This procedure may be referred to as an FR procedure, because the UE may attempt to expedite the return to the first RAT network using previously obtained cell frequency information (e.g., NR frequency) related to the first RAT network (rather than perform a full frequency scan). The UE may obtain the cell frequency information related to the first RAT network according to various options. For example, according to a first option, before the fallback happens, while the UE is still in NR, the UE could store this NR frequency information and use it in FR procedure. According to a second option, when the UE moves to LTE during the fallback procedure, the network may broadcast a system information block (e.g., SIB24), which may also contain neighbor NR frequency information that the UE could use in the FR procedure. According to a third option, when the UE is in the LTE RRC connection state (during the fallback procedure), the network may configure the UE to measure neighbor NR frequencies and the UE could use this NR frequency information in the FR procedure.

FIG. 7 illustrates a scenario similar to FIG. 6 where the UE receives a second command from the LTE network prior to expiration of a timer. In this example, however, the second command indicates the UE to return to the first RAT network in the SA mode. Thus, in this case, the UE may follow the second command. The UE then stops the timer and moves to the first RAT network in the SA mode.

FIG. 8 illustrates a scenario where the UE does not receive a second command from the LTE network prior to expiration of the FR timer. As illustrated, when a UE detects expiration of the FR timer (but the second RAT network has still not added a SCG to the UE per FIG. 6 or redirected the UE to a first RAT network per FIG. 7), the UE then initiates a FR procedure to attempt a return to the first RAT network in a SA mode using previously obtained cell frequency information related to the first RAT network. The UE then moves to the first RAT network in the SA mode.

By configuring a UE to prioritize returning to a 5G SA network, rather than a non-standalone NSA, the techniques presented herein may allow the UE to stay in 5G SA service longer, which may result in availability of greater services, improved performance, and better overall user experience.

Example Wireless Communication Devices

Figure 9:
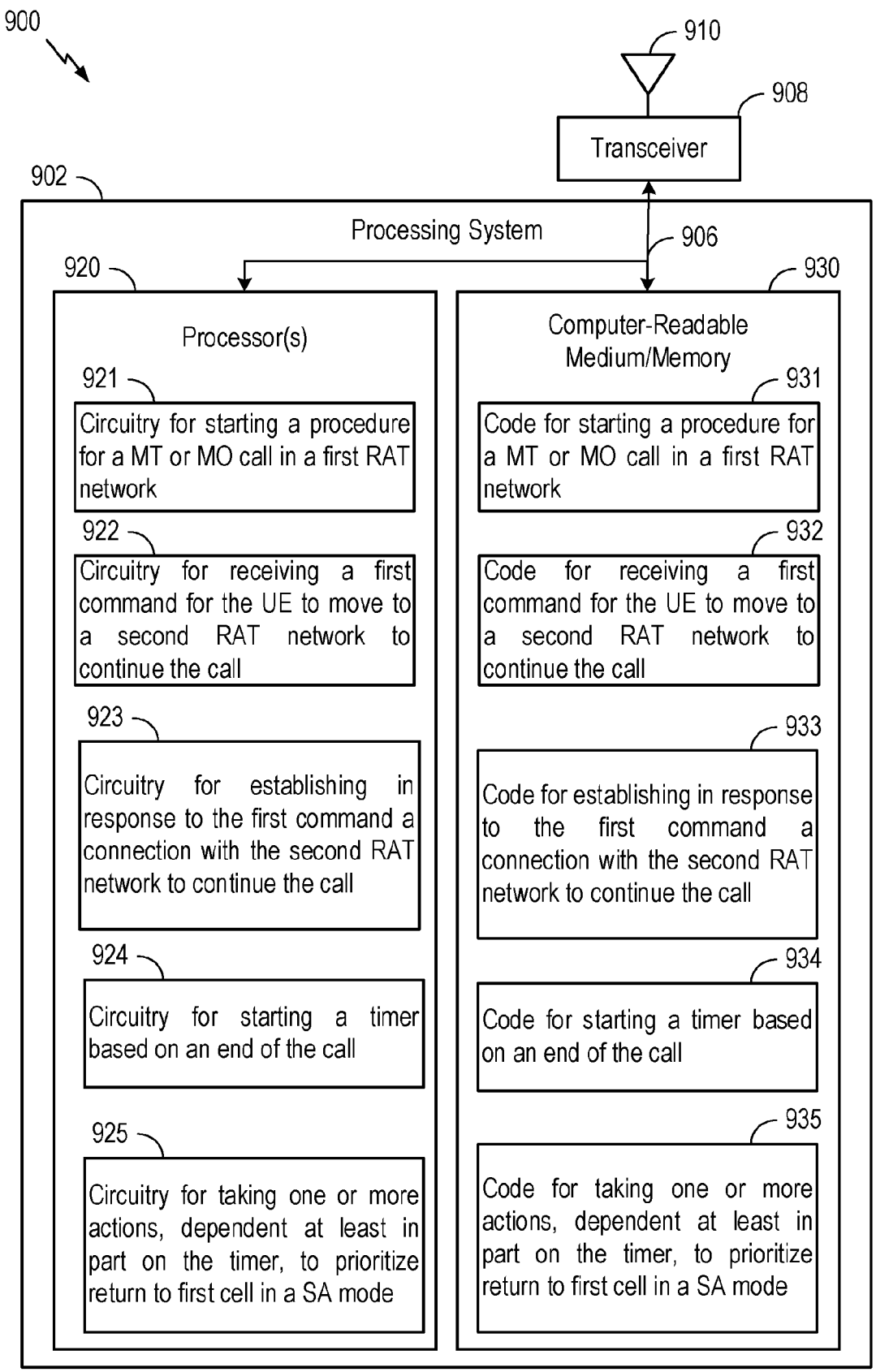
FIG. 9 depicts aspects of an example communications device, according to certain aspects of the present disclosure.

FIG. 9 depicts an example communications device 900 that includes various components operable, configured, or adapted to perform operations for the techniques disclosed herein, such as the operations depicted and described with respect to FIG. 5. In some examples, communication device 900 may be a user equipment (UE) 104 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 920 via a bus 906. In certain aspects, computer-readable medium/memory 920 is configured to store instructions (e.g., computer-executable code) that when executed by the one or more processors 920, cause the one or more processors 920 to perform the operations illustrated in FIG. 5, or other operations for performing the various techniques discussed herein.

In the depicted example, computer-readable medium/memory 930 stores code 931 for starting a procedure for a mobile terminated (MT) or mobile originated (MO) call in a first radio access technology (RAT) network; code 932 for receiving a first command for the UE to move to a second RAT network to continue the call; code 933 for establishing, in response to the first command, a connection with the second RAT network to continue the call; code 934 for starting a timer based on an end of the call; and code 935 for taking one or more actions, dependent at least in part on the timer, to prioritize return to the first RAT network in a standalone (SA) mode.

In the depicted example, the one or more processors 920 include circuitry configured to implement the code stored in the computer-readable medium/memory 920, including circuitry 921 for starting a procedure for a MT or MO call in a first RAT network; circuitry 922 for receiving a first command for the UE to move to a second RAT network to continue the call; circuitry 923 for establishing, in response to the first command, a connection with the second RAT network to continue the call; circuitry 924 for starting a timer based on an end of the call; and circuitry 925 for taking one or more actions, dependent at least in part on the timer, to prioritize return to the first RAT network in a SA mode. Various components of communications device 900 may provide means for performing the methods described herein, including with respect to FIG. 5.

In some examples, means for transmitting or sending (or means for outputting for transmission) may include the transceivers 254 and/or antenna(s) 252 of the UE 104 illustrated in FIG. 2 and/or transceiver 908 and antenna 910 of the communication device 900 in FIG. 9.

In some examples, means for receiving (or means for obtaining) may include the transceivers 254 and/or antenna(s) 252 of the user equipment 104 illustrated in FIG. 2 and/or transceiver 908 and antenna 910 of the communication device 900 in FIG. 9.

In some examples, means for starting a procedure for a MT or MO call in a first RAT network, means for receiving a first command for the UE to move to a second RAT network to continue the call, means for establishing in response to the first command a connection with the second RAT network to continue the call, means for starting a timer based on an end of the call, and means for taking one or more actions dependent at least in part on the timer to prioritize return to the first RAT network in a SA mode may include various processing system components, such as: the one or more processors 920 in FIG. 9, or aspects of the UE 104 depicted in FIG. 2, including receive processor 258, transmit processor 264, TX MIMO processor 266, and/or controller/processor 280 (including EPS fallback component 281).

Notably, FIG. 9 is just use example, and many other examples and configurations of communication device 900 are possible.

EXAMPLE CLAUSES

Implementation examples are described in the following numbered clauses:

Clause 1: A method for wireless communications by a user equipment (UE), comprising: starting a procedure for a mobile terminated (MT) or mobile originated (MO) call in a first radio access technology (RAT) network; receiving a first command for the UE to move to a second RAT network to continue the call; establishing, in response to the first command, a connection with the second RAT network to continue the call; starting a timer based on an end of the call; and taking one or more actions, dependent at least in part on the timer, to prioritize return to the first RAT network in a standalone (SA) mode.

Clause 2: The method alone or in combination with the first clause, further comprising receiving, prior to expiration of the timer, a second command for the UE to return to the first RAT network.

Clause 3: The method alone or in combination with one or more of the first and second clauses, wherein the one or more actions comprise deciding whether to follow or ignore the second command depending on whether the second command is for the UE to return to the first RAT network in the SA mode or a non-standalone (NSA) mode.

Clause 4: The method alone or in combination with one or more of the first through third clauses, wherein the one or more actions comprise, when the second command is for the UE to return to the first RAT network in the NSA mode: ignoring the second command; and initiating a procedure to attempt a return to the first RAT network in the SA mode.

Clause 5: The method alone or in combination with one or more of the first through fourth clauses, wherein the procedure comprises a fast return procedure to attempt a return to the first RAT network using previously obtained cell frequency information related to the first RAT network.

Clause 6: The method alone or in combination with one or more of the first through fifth clauses, further comprising obtaining the cell frequency information related to the first RAT network while continuing the call in the second RAT network.

Clause 7: The method alone or in combination with one or more of the first through sixth clauses, wherein the one or more actions comprise: following the second command when the second command is for the UE to return to the first RAT network in the SA mode.

Clause 8: The method alone or in combination with one or more of the first through seventh clauses, wherein the one or more actions comprise: detecting expiration of the timer; and initiating, in response to the detection, a fast return procedure to attempt a return to the first RAT network in the SA mode using previously obtained cell frequency information related to the first RAT network.

Clause 9: An apparatus, comprising: a memory comprising executable instructions; one or more processors configured to execute the executable instructions and cause the apparatus to perform a method in accordance with any one of Clauses 1-8.

Clause 10: An apparatus, comprising means for performing a method in accordance with any one of Clauses 1-8.

Clause 11: A non-transitory computer-readable medium comprising executable instructions that, when executed by one or more processors of an apparatus, cause the apparatus to perform a method in accordance with any one of Clauses 1-8.

Clause 12: A computer program product embodied on a computer-readable storage medium comprising code for performing a method in accordance with any one of Clauses 1-8.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and base station (BS) 102, next generation NodeB (gNB or gNodeB), access point (AP), distributed unit (DU), carrier, or transmission reception point may be used interchangeably. A BS 102 may provide communication coverage for a macro cell, a pico cell, a femto cell, and/or other types of cells.

A macro cell may generally cover a relatively large geographic area (e.g., several kilometers in radius) and may allow unrestricted access by user equipments (UEs) 104 with service subscription. A pico cell may cover a relatively small geographic area (e.g., a sports stadium) and may allow unrestricted access by UEs 104 with service subscription. A femto cell may cover a relatively small geographic area (e.g., a home) and may allow restricted access by UEs 104 having an association with the femto cell (e.g., UEs in a Closed Subscriber Group (CSG) and UEs 104 for users in the home). A BS 102 for a macro cell may be referred to as a macro BS. A BS 102 for a pico cell may be referred to as a pico BS. A BS 102 for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some BSs 102, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between BSs 102 and, for example, UEs 104, may be through one or more carriers. For example, BSs 102 and UEs 104 may use spectrum up to YMHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink (DL) and uplink (UL) (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI- RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of user equipment (UE) optimization in evolved packet system (EPS) fallback fast return procedure in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:

starting a procedure for a mobile terminated (MT) or mobile originated (MO) call in a first radio access technology (RAT) network;
receiving a first command for the UE to move to a second RAT network to continue the call;
establishing, in response to the first command, a connection with the second RAT network to continue the call;
starting a timer based on an end of the call; and
taking one or more actions, dependent at least in part on the timer, to prioritize return to the first RAT network in a standalone (SA) mode.

2. The method of claim 1, further comprising:
receiving, prior to expiration of the timer, a second command for the UE to return to the first RAT network.

3. The method of claim 2, wherein the one or more actions comprise deciding whether to follow or ignore the second command depending on whether the second command is for the UE to return to the first RAT network in the SA mode or a non-standalone (NSA) mode.

4. The method of claim 3, wherein the one or more actions comprise, when the second command is for the UE to return to the first RAT network in the NSA mode:
ignoring the second command; and
initiating a procedure to attempt a return to the first RAT network in the SA mode.

5. The method of claim 4, wherein the procedure comprises a fast return procedure to attempt a return to the first RAT network using previously obtained cell frequency information related to the first RAT network.

6. The method of claim 5, further comprising obtaining the cell frequency information related to the first RAT network while continuing the call in the second RAT network.

7. The method of claim 3, wherein the one or more actions comprise:
following the second command when the second command is for the UE to return to the first RAT network in the SA mode.

8. The method of claim 1, wherein the one or more actions comprise:
detecting expiration of the timer; and
initiating, in response to the detection, a fast return procedure to attempt a return to the first RAT network in the SA mode using previously obtained cell frequency information related to the first RAT network.

9. An apparatus for wireless communications by a user equipment (UE), comprising:
at least one processor and a memory configured to:
start a procedure for a mobile terminated (MT) or mobile originated (MO) call in a first radio access technology (RAT) network;
receive a first command for the UE to move to a second RAT network to continue the call;
establish, in response to the first command, a connection with the second RAT network to continue the call;
start a timer based on an end of the call; and
take one or more actions, dependent at least in part on the timer, to prioritize return to the first RAT network in a standalone (SA) mode.

10. The apparatus of claim 9, wherein the at least one processor and the memory are further configured to:
receive, prior to expiration of the timer, a second command for the UE to return to the first RAT network.

11. The apparatus of claim 10, wherein the one or more actions comprise deciding whether to follow or ignore the second command depending on whether the second command is for the UE to return to the first RAT network in the SA mode or a non-standalone (NSA) mode.

12. The apparatus of claim 11, wherein the one or more actions comprise, when the second command is for the UE to return to the first RAT network in the NSA mode:
ignoring the second command; and
initiating a procedure to attempt a return to the first RAT network in the SA mode.

13. The apparatus of claim 12, wherein the procedure comprises a fast return procedure to attempt a return to the first RAT network using previously obtained cell frequency information related to the first RAT network.

14. The apparatus of claim 13, wherein the at least one processor and the memory are further configured to obtain the cell frequency information related to the first RAT network while continuing the call in the second RAT network.

15. The apparatus of claim 11, wherein the one or more actions comprise:
following the second command when the second command is for the UE to return to the first RAT network in the SA mode.

16. The apparatus of claim 9, wherein the one or more actions comprise:
detecting expiration of the timer; and
initiating, in response to the detection, a fast return procedure to attempt a return to the first RAT network in the SA mode using previously obtained cell frequency information related to the first RAT network.

17. An apparatus for wireless communications by a user equipment (UE), comprising:
means for starting a procedure for a mobile terminated (MT) or mobile originated (MO) call in a first radio access technology (RAT) network;
means for receiving a first command for the UE to move to a second RAT network to continue the call;
means for establishing, in response to the first command, a connection with the second RAT network to continue the call;
means for starting a timer based on an end of the call; and
means for taking one or more actions, dependent at least in part on the timer, to prioritize return to the first RAT network in a standalone (SA) mode.

18. The apparatus of claim 17, further comprising:
means for receiving, prior to expiration of the timer, a second command for the UE to return to the first RAT network.

19. The apparatus of claim 18, wherein the one or more actions comprise deciding whether to follow or ignore the second command depending on whether the second command is for the UE to return to the first RAT network in the SA mode or a non-standalone (NSA) mode.

20. The apparatus of claim 19, wherein the one or more actions comprise, when the second command is for the UE to return to the first RAT network in the NSA mode:
ignoring the second command; and
initiating a procedure to attempt a return to the first RAT network in the SA mode.

21. The apparatus of claim 20, wherein the procedure comprises a fast return procedure to attempt a return to the first RAT network using previously obtained cell frequency information related to the first RAT network.

22. The apparatus of claim 21, further comprising:
means for obtaining the cell frequency information related to the first RAT network while continuing the call in the second RAT network.

23. The apparatus of claim 19, wherein the one or more actions comprise:
following the second command when the second command is for the UE to return to the first RAT network in the SA mode.

24. The apparatus of claim 17, wherein the one or more actions comprise:
detecting expiration of the timer; and
initiating, in response to the detection, a fast return procedure to attempt a return to the first RAT network in the SA mode using previously obtained cell frequency information related to the first RAT network.

25. A non-transitory computer-readable medium storing instructions that, when executed by one or more processors of a user equipment (UE), cause the UE to:
start a procedure for a mobile terminated (MT) or mobile originated (MO) call in a first radio access technology (RAT) network;
receive a first command for the UE to move to a second RAT network to continue the call;
establish, in response to the first command, a connection with the second RAT network to continue the call;
start a timer based on an end of the call; and
take one or more actions, dependent at least in part on the timer, to prioritize return to the first RAT network in a standalone (SA) mode.

26. The non-transitory computer-readable medium of claim 25, wherein the UE is further configured to:
receive, prior to expiration of the timer, a second command for the UE to return to the first RAT network.

27. The non-transitory computer-readable medium of claim 26, wherein the one or more actions comprise deciding whether to follow or ignore the second command depending on whether the second command is for the UE to return to the first RAT network in the SA mode or a non-standalone (NSA) mode.

28. The non-transitory computer-readable medium of claim 27, wherein the one or more actions comprise, when the second command is for the UE to return to the first RAT network in the NSA mode:
ignoring the second command; and
initiating a procedure to attempt a return to the first RAT network in the SA mode.

29. The non-transitory computer-readable medium of claim 28, wherein the procedure comprises a fast return procedure to attempt a return to the first RAT network using previously obtained cell frequency information related to the first RAT network.

30. The non-transitory computer-readable medium of claim 29, wherein the UE is further configured to obtain the cell frequency information related to the first RAT network while continuing the call in the second RAT network.

* * * * *